May 7, 1968 D. L. MILLER ETAL 3,381,784
ELECTROMAGNETIC CLUTCH AND BRAKE
Filed May 9, 1966
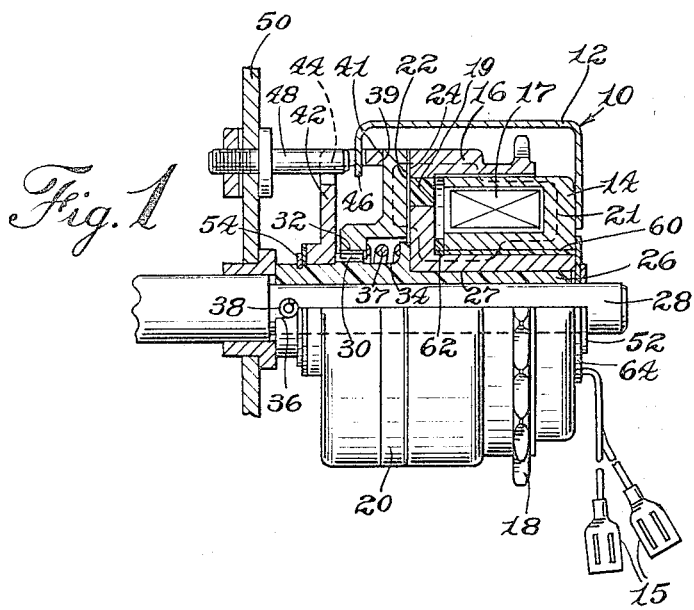
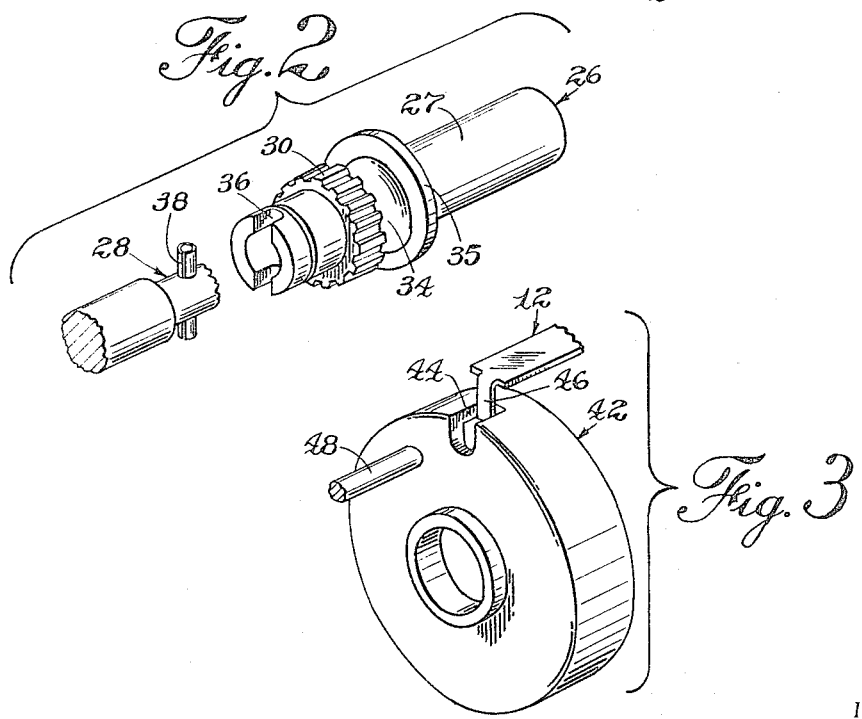
INVENTOR.
Donald L. Miller
Frederick R. Birdsall
WITNESS:
Esther M. Stockton
BY David S. Woronoff
ATTORNEY

United States Patent Office 3,381,784
Patented May 7, 1968

3,381,784
ELECTROMAGNETIC CLUTCH AND BRAKE
Donald L. Miller, Horseheads, N.Y., and Fred R. Birdsall, Sayre, Pa., assignors to The Bendix Corporation, a corporation of Delaware
Filed May 9, 1966, Ser. No. 548,548
1 Claim. (Cl. 192—18)

ABSTRACT OF THE DISCLOSURE

An electromagnetic clutch and brake adapted to be mounted on a single support shaft. The single shaft supports input armature, magnetic coil and non-rotatable magnetic body, a sliding power transferring armature and fixed braking element. The sliding power transferring element is spline-connected to the power output shaft and is spring-biased against the braking element which is connected by a support to the magnetic body to prevent rotation.

---

A clutch-brake combination such as will be described in the following specification has many applications but a particular application is for use in a modern office copying machine where a single power shaft will be used to power and brake a roller containing printing paper. In such an application for the clutch of the type to be described, it is extremely desirable that the clutch-brake combination be entirely self-contained. It is further desirable that the the clutch-brake combination be readily installable and removab'e for simple repair and replacement. It is also desirable that the clutch-brake combination be compact, efficient and relatively noise-free.

It is an object of the present invention to provide a self-contained clutch and brake mechanism which can be simply mounted on the shaft to be driven and braked.

It is an object of the present invention to provide a clutch-brake mechanism which is supported by a single support member.

It is an object of the present invention to provide a novel clutch and brake mechanism in which a spring biasing the power input and power output members out of engagement is contained entirely within the clutch-brake assembly and does not exert forces on the shaft to be driven and braked.

It is an object of the present invention to provide a novel electromagnetic clutch and brake mechanism in which the spring biased member is contained between members which are rotationally linked together.

It is an object of the present invention to provide a clutch and brake mechanism in which the driven shaft travels a known distance after clutch disengagement.

It is an object of the present invention to provide a novel electromagnetic clutch and brake mechanism which has a fail-safe feature in that any failure of a mechanism will cause the brakes to be applied.

It is a further object of the present invention to provide a novel electromagnetic clutch and brake mechanism in which the brake member prevents rotation of both the output power member and the clutch-brake mechanism housing.

It is a still further object of the present invention to provide a single support shaft member which supports both rotating and non-rotating members.

The invention further lies in the particular organization of the various elements of the system and their cooperative association with one another to produce the beneficial results intended. The foregoing and other objects and advantages of the invention will appear more fully hereafter from the consideration of the detailed description which follows, taken together with the accompanying drawing wherein one embodiment of the invention is illustrated. It is to be expressly understood, however, that the drawing is for the purpose of illustration and description and not to be construed as to defining the limits of the invention. In the drawing wherein an electromagnetic clutch and brake embodying the invention is illustrated:

FIGURE 1 is a side view, partly broken away and in section, illustrating an electromagnetic clutch and brake embodying the present invention;

FIGURE 2 is an exploded fragmentary view showing the interconnection between the clutch and brake combination and the shaft to be driven; and FIGURE 3 is an exploded view showing in detail the interconnection between the brake section of the present invention and the housing of the electromagnetic clutch and brake and a fixed member relative to the shaft to be driven.

Turning now to FIGURE 1, an electromagnetic clutch and brake combination, shown generally by the numeral 10, has a strap or housing 12 which encloses or embraces a magnet body 14 and a magnet plate member 16 which has a torque transmitting surface 18 formed thereon shown in the form of a chain drive sprocket. The magnet body member 14 may be fixedly connected to the strap or housing 12. Enclosed between the magnet plate member 16 and the magnet body member 14 is a coil 17 which may be energized through lead wires 15 to form an electromagnetic field. The magnet body 14 is supported radially in the magnet plate 16 by a synthetic plastic-type sleeve 60 which may have a flux conducting material distributed throughout or have flux conducting properties. Washers 62 and 64 which support the magnet body axially may be made of the same synthetic plastic-type material such as sleeve 60. Sleeve 60 and washers 62 and 64 preferably have good bearing characteristics. Washer 64 extends to the shaft 28 to be held by lock ring 52. An armature member 20 having a torque transmitting surface 22 adapted to engage the torque transmitting surface 24 of the magnet plate member 16 is mounted coaxially with the magnet plate member 16. A second torque transmitting surface 39, more properly termed a torque absorbing surface, is formed on the other transverse end of the armature plate member to engage surface 41 of the brake member 42 which is an annular cup-shaped member.

A single support shaft 26 supports the electromagnetic clutch and brake combination. The support shaft 26 is adapted to fit over the driven shaft 28 which may be connected, for example, to a paper roll of a copying machine. The support shaft member 26 has a first surface 27 which is a bearing surface and which enables the magnet plate member 16 to be supported rotationally thereon. A shoulder 35 is also formed as part of the support member 26 surface. A splined or toothed surface 30 is formed on the support member surface for engaging a matching spline 32 formed in the armature member 20. A transverse end of the support shaft 26 has a plurality of slots 36 formed therein for engaging a drive or roll pin member 38 which is fitted through a portion of the driven shaft member 28. A well shaped surface or recess 34 is formed as part of the support shaft member 26 intermediate to the splined portion 30 and the lip or shoulder portion 35 for containing the resilient member which is shown as a coil spring 37.

A non-flux conducting material 19 or a gap is formed in the magnet plate member 16 to force the magnetic field to link the magnet plate member 16 and the armature plate member 20 so that the magnetic flux path is shown by the dotted lines 21. The brake housing member 42 has a slot 44 formed therein for receiving a linking or arm member 46 from the strap or housing 12 and a shaft or pin member 48 from the machine 50 to which the clutch and brake combination is mounted for preventing the rotation of the housing 12 and the brake member 42. The housing 12 and the arm portion 46 are shown in the drawing of the preferred embodiment of the present invention as one integral member. This member is relatively narrow in the preferred embodiment and is oriented with respect to the torque transmitting surface 18 to facilitate torque input or output as, for example, by a chain or belt drive. The brake member 42 also has a surface 41 formed thereon for engaging the armature member brake surface 39.

It can readily be seen that the present invention accomplishes its stated objects. The present invention teaches a combined clutch-brake actuated electromagnetically and spring biased in a braking direction so that when power is turned off, the brake will be effective and, if the unit were used to drive the roller of a copier machine, the roller will no longer turn. Thus, a fail-safe unit is provided. Importantly, the shaft 28 will travel a constant distance after power to the coil 17 is turned off. The brake member 42, through the action of the pin 48 which is fastened to a fixed member 50, is operative to not only brake the shaft 28, but to prevent rotation of the housing 12.

It is further important to note that the entire mechanism is mounted on a single shaft member 26 which is formed to have a driving connection 36 through pin 38 to the shaft 28 to be driven and braked and a gear portion 30 formed on the shaft to enable the driving of the shaft 28 and a well section 34 in which the biased spring 36 is housed. The shaft member 26 may be formed of a synthetic plastic-type material having very low moisture absorption properties and low friction characteristics. It should also be noted that while two lock rings 54 and 52 are shown, only lock ring 52 is needed to attach the unit to the shaft 28 to be driven and braked. The lock ring 54 fastens to the assembly on one end of the support shaft member 26 while the lock ring 52 is the only member which is needed to maintain the clutch-brake unit on the shaft 28. Lock ring 52 may be self-locking so that all shaft end play is taken up and no groove is required to be machined in shaft 28.

It can further be appreciated that the cup shape of the magnet plate member 16 enables the relatively simple construction of the remainder of the clutch-brake unit. It should be noted that the magnet plate member contains the sprocket portion 18 for driving shaft 28 through the armature member 20 and further provides a part of the housing for the coil 17. It should further be noted that the magnet body portion 16 rides on the bearing surface 27 of the support shaft member 26. The clutch-brake unit may be assembled by the manufacturer about shaft 26. Only three parts need be left unassembled—lock rings 52, washer 64 and roll pin 38. The clutch-brake unit may be sold as an assembled unit for connection to a shaft 28 to be driven and braked. The manufacturer of the clutch-brake unit has, by this novel construction, virtually complete control over tolerances, clearances, quality control and manufacturing processes not otherwise achievable. Assembly of shaft 28 is extremely simple as can be readily appreciated from the preceding description and figures. It is simply a matter of placing the driving pin 38 through the shaft 28, slipping the assembled clutch-brake unit 10 on the shaft 28, engaging the driving connection 36 with the pin 38 and then fastening the lock ring 52 on the shaft 28. The shaft 28 may be rough machined or otherwise roughly finished since there is no relative motion between shafts 26 and 28, thereby lowering the cost of joining a clutch-brake unit to the shaft ultimately to be controlled.

We claim:
1. An electromagnetic clutch and brake comprising:
a magnet body member;
a coil means disposed in said magnet body member;
a rotatable, axially-fixed, power inpart member having inner and outer axially-extending members;
a rotatable power output member having first and second transverse ends adapted for transmitting torque;
a non-rotatable brake member having a portion adapted to engage said second transverse end;
said first transverse end adapted to engage said power input member;
an axially-extending support member having a first outer bearing surface for rotationally supporting said power input member, said support member having a splined portion for engaging said power output member and for permitting axial movement of said power output member between said brake member and said power input member, and a second bearing surface for non-rotationally supporting said brake member;
said support member adapted to engage a power shaft to control rotation thereof;
said brake member comprising an annular cup-shaped member having a slot formed therein adapted to engage a fixed brake pin member; and
a strap member interconnects said brake member slot and said magnet body member to prevent rotation of said magnet body member.

References Cited
UNITED STATES PATENTS

| | | | |
|---|---|---|---|
| 647,436 | 4/1900 | Beck | 192—18.2 |
| 936,284 | 10/1909 | Abernethy | 192—18.2 |
| 2,779,448 | 1/1957 | Lambach | 192—18.2 |
| 2,859,845 | 11/1958 | Bachman | 192—18.2 |
| 2,976,093 | 3/1961 | Reiling | 192—110 |
| 3,052,335 | 9/1962 | Sulger | 192—18.2 |

CARLTON R. CROYLE, *Primary Examiner.*

MARK NEWMAN, *Examiner.*

C. M. LEEDOM, *Assistant Examiner.*